(12) United States Patent
Pav et al.

(10) Patent No.: US 7,403,387 B2
(45) Date of Patent: Jul. 22, 2008

(54) DIRECTING AIR IN A CHASSIS

(75) Inventors: Darren B. Pav, Round Rock, TX (US); Troy Bryant, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 27 days.

(21) Appl. No.: 11/532,016

(22) Filed: Sep. 14, 2006

(65) Prior Publication Data

US 2008/0068795 A1    Mar. 20, 2008

(51) Int. Cl.
*H05K 7/20* (2006.01)
(52) U.S. Cl. .................. 361/694; 361/695; 454/184
(58) Field of Classification Search .................. None
See application file for complete search history.

(56) References Cited

U.S. PATENT DOCUMENTS

| | | | |
|---|---|---|---|
| 5,338,214 A * | 8/1994 | Steffes et al. ............... 439/160 |
| 5,375,038 A | 12/1994 | Hardt | |
| 5,432,674 A | 7/1995 | Hardt | |
| 5,822,188 A * | 10/1998 | Bullington ................... 361/695 |
| 6,094,346 A * | 7/2000 | Schweers et al. ............ 361/695 |
| 6,108,203 A | 8/2000 | Dittus et al. | |
| 6,288,998 B1 * | 9/2001 | Taira ........................ 369/275.4 |
| 6,400,568 B1 * | 6/2002 | Kim et al. .................... 361/697 |
| 6,678,157 B1 * | 1/2004 | Bestwick ..................... 361/695 |
| 6,741,467 B2 * | 5/2004 | Coglitore et al. ............. 361/687 |
| 6,744,632 B2 * | 6/2004 | Wilson et al. ................ 361/695 |
| 6,927,976 B1 | 8/2005 | Malone et al. | |
| 7,285,323 B2 * | 10/2007 | Sone et al. ................... 428/212 |

* cited by examiner

*Primary Examiner*—Gregory D Thompson
(74) *Attorney, Agent, or Firm*—Haynes and Boone, LLP (57) ABSTRACT

An air directing apparatus includes a first air directing member defining a component access passageway. A second air directing member is moveably coupled to the first air directing member, whereby the second air directing member is moveable relative to the first air directing member into a first position and a second position, wherein with the second air directing member in the first position the component access passageway is substantially obstructed and with the second air directing member in the second position the component access passageway is substantially unobstructed.

19 Claims, 9 Drawing Sheets

DIRECTING AIR IN A CHASSIS

BACKGROUND

The present disclosure relates generally to information handling systems, and more particularly to directing air in an information handling system chassis.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs typically include an IHS chassis having a plurality of fans that are used to cool different components of the IHS. As the component of the IHS become more powerful, along with the IHS chassis becoming smaller, the cooling of the components of the IHS raises a number of issues.

One way to deal with the problem of cooling the components of the IHS is to position baffles in the IHS chassis in order to direct the air flow from the fans towards components of the IHS that need the most cooling. Such baffles allow for a more efficient use of the fans in order to provide greater cooling of the components of the IHS using the same, and sometimes fewer, number of fans.

However, positioning the baffles in the IHS chassis creates obstructions in the IHS chassis that can obstruct access to certain areas of the IHS chassis. For example, during the assembly of the IHS, the IHS chassis may move along an assembly line in a particular orientation and the baffle may prevent the assembler from accessing connectors or components in the IHS chassis, which can increase factory assembly times and costs. Furthermore, the baffle may obstruct access to areas of the IHS chassis when the IHS is being serviced.

Accordingly, it would be desirable to provide for directing air in an IHS chassis absent the disadvantages found in the prior methods discussed above.

SUMMARY

According to one embodiment, an air directing apparatus includes a first air directing member defining a component access passageway, and a second air directing member moveably coupled to the first air directing member, whereby the second air directing member is moveable relative to the first air directing member into a first position and a second position, wherein with the second air directing member in the first position the component access passageway is substantially obstructed and with the second air directing member in the second position the component access passageway is substantially unobstructed.

BRIEF DESCRIPTION OF THE DRAWINGS

FIG. 2b is a rear perspective view illustrating an embodiment of the first air directing member of FIG. 2a.

FIG. 3 is a perspective view illustrating an embodiment of a second air directing member used with the first air directing member of FIGS. 2a and 2b.

FIG. 5a is a flow chart illustrating an embodiment of a method for directing air in a chassis.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
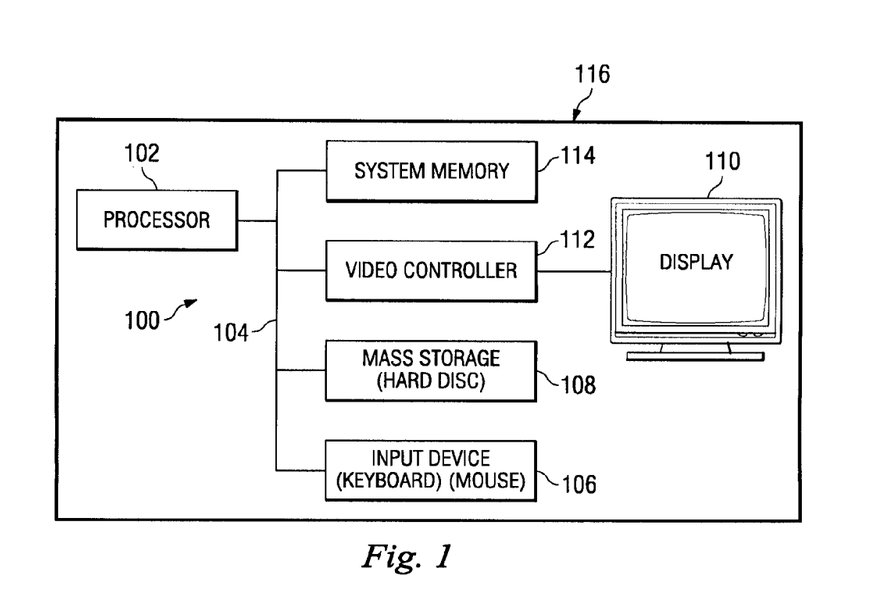
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of computer system 100. An input device 106 is coupled to processor 102 to provide input to processor 102. Examples of input devices include keyboards, touchscreens, and pointing devices such as mouses, trackballs and trackpads. Programs and data are stored on a mass storage device 108, which is coupled to processor 102. Mass storage devices include such devices as hard disks, optical disks, magneto-optical drives, floppy drives and the like. IHS 100 further includes a display 110, which is coupled to processor 102 by a video controller 112. A system memory 114 is coupled to processor 102 to provide the processor with fast storage to facilitate execution of computer programs by processor 102. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
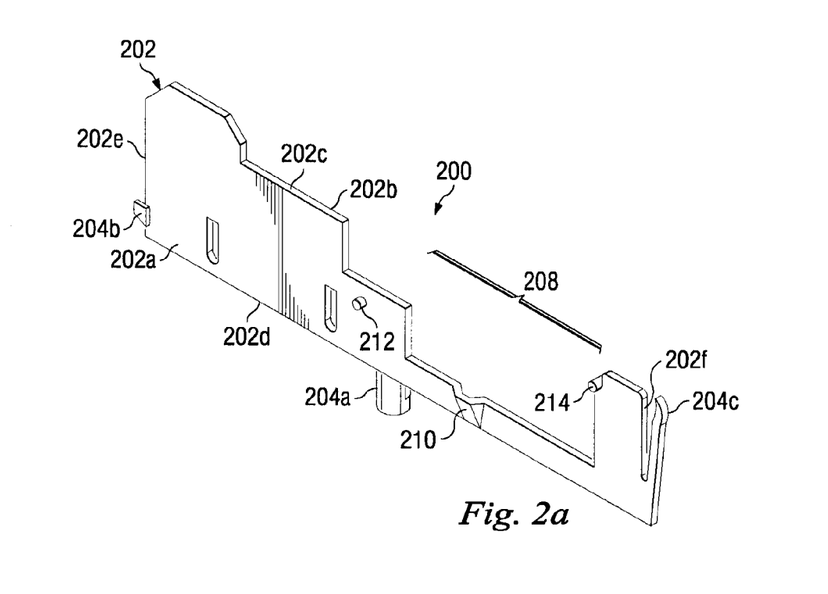
FIG. 2a is a front perspective view illustrating an embodiment of a first air directing member.
Figures 2B, 3, 5A:
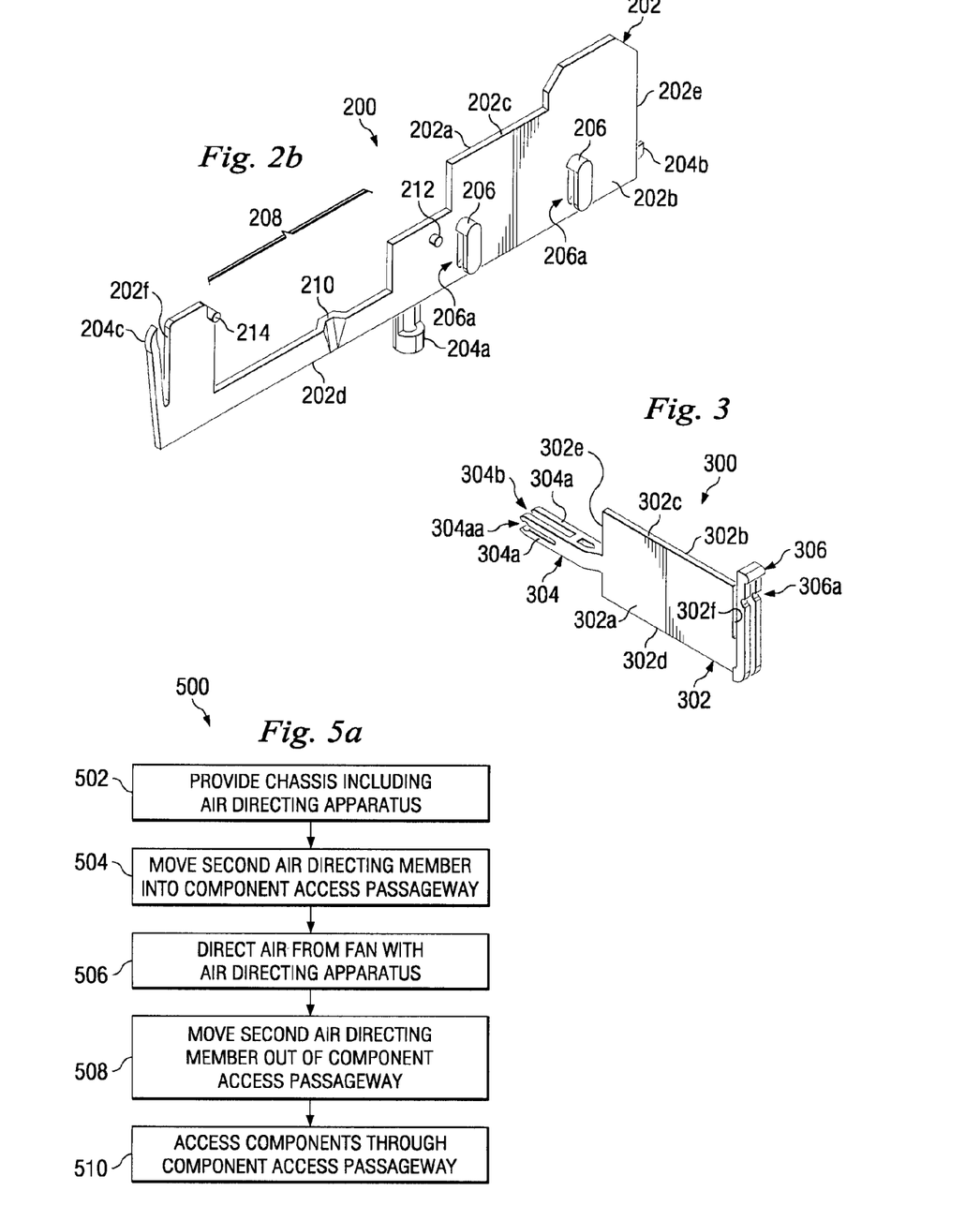

Referring now to FIGS. 2a and 2b, a first air directing member 200 is illustrated. The first air directing member 200 includes a base 202 having a front surface 202a, a rear surface 202b located opposite the front surface 202a, a top edge 202c extending between the front surface 202a and the rear surface 202b, a bottom edge 202d located opposite the top edge 202c and extending between the front surface 202a and the rear surface 202b, and a pair of opposing side edges 202e and 202f extending between the front surface 202a, the rear surface 202b, the top edge 202c, and the bottom edge 202d. A chassis coupling member 204a extends from the bottom edge 202d of the base 202 and is substantially centrally located on the bottom edge 202d. A chassis coupling member 204b extends from the front surface 202a and out past the side edge 202e of the base 202. A chassis coupling member 204c extends from the side edge 202f and is resiliently coupled to the side edge 202e such that the chassis coupling member 204c can move relative to the side edge 202e. A pair of cable routing features 206 extend from the rear surface 202b of the base 202, each cable routing feature 206 defining a cable securing passageway 206a between itself and the rear surface 202b. The base 202 defines a component access passageway 208 approximately from a point midway along the length of the base 202 to a point adjacent the side edge 202f of the base 202. A component access channel 210 extends from the front surface 202a of the base 202 and is located adjacent the component access passageway 208. A pivotal coupling feature 212 extends from the front surface 202a and the rear surface 202b and is located substantially centrally on the base 202 and adjacent the component access passageway 208. A second air directing member securing feature 214 extends from the front surface 202a and the rear surface 202b and is located adjacent the component access passageway 208 opposite the pivotal coupling feature 212.

Referring now to FIG. 3, a second air directing member 300 is illustrated. The second air directing member 300 includes a base 302 having a front surface 302a, a rear surface 302b located opposite the front surface 302a, a top edge 302c extending between the front surface 302a and the rear surface 302b, a bottom edge 302d located opposite the top edge 302c and extending between the front surface 302a and the rear surface 302b, and a pair of opposing side edges 302e and 302f extending between the front surface 302a, the rear surface 302b, the top edge 302c, and the bottom edge 302d. A pivotal coupling member 304 extends from the side edge 302e and includes a plurality of arms 304a each defining a pivotal coupling feature channel 304aa and together defining a channel 304b between them. A securing member 306 extends from the side edge 302f of the base 302 such that the securing member 306 may move relative to the side edge 302f, and defines a first air directing member securing feature 306a located on the securing member 306 adjacent the top edge 302c of the base 302.

Figure 4:
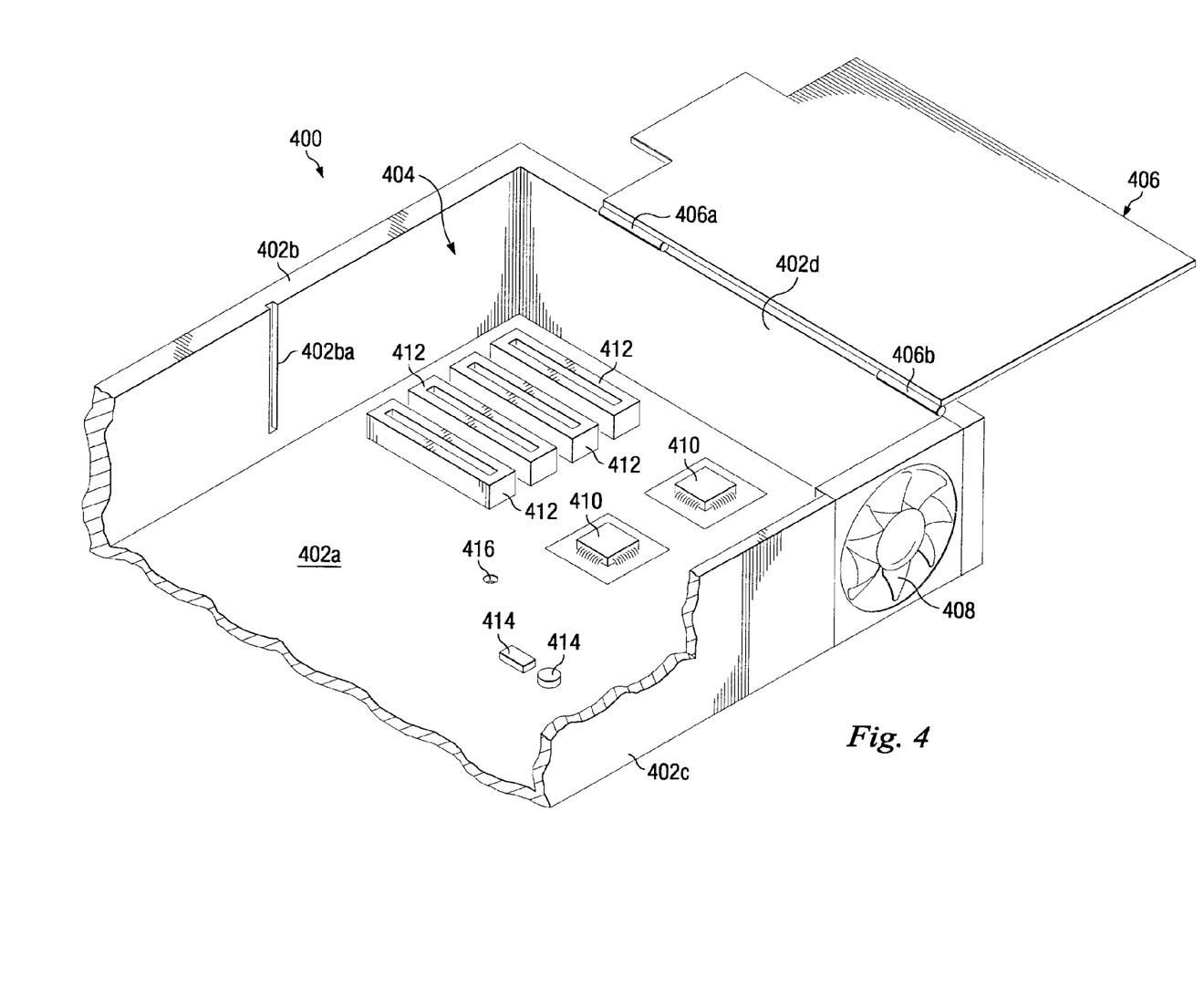
FIG. 4 is a perspective view illustrating an embodiment of a chassis used with the first air directing member of FIGS. 2a and 2b and the second air directing member of FIG. 3.

Referring now to FIG. 4, a chassis 400 is illustrated. The chassis 400 may be, for example, the chassis 116, described above with reference to FIG. 1, and may house some or all of the components of the IHS 100, described above with reference to FIG. 1. The chassis 400 includes a chassis floor 402a which may include, for example, a circuit board. A plurality of opposing side walls 402b and 402c extend from the chassis floor 402a in a spaced apart orientation from each other and a substantially perpendicular orientation to the chassis floor 402a. The side wall 402b defines a securing channel 402ba that is oriented substantially perpendicularly to the chassis floor 402a. A rear wall 402d extends from the chassis floor 402a and between the side walls 402b and 402c. The chassis floor 402a, the side walls 402b and 402c, and the rear wall 402d define a chassis housing 404 between them. A top wall 406 is pivotally coupled to the rear wall 402d by a pair of pivotal couplers 406a and 406b. A fan 408 is included in the side wall 402c and located adjacent the rear wall 402d. A plurality of processors 410 are coupled to the chassis floor 402a in a spaced apart relationship from each other. A plurality of device couplers 412 extend from the chassis floor 402a and are electrically coupled to the processors 410 through, for example, a circuit board on the chassis floor 402a. A plurality of IHS plugs 414 are located in the chassis floor 402a and may be electrically coupled to the processors 410 and/or the device connectors 412 through, for example, a circuit board on the chassis floor 402a. An air directing member securing aperture 416 is defined by the chassis floor 402a and located substantially centrally on the chassis floor 402a.

Figure 5B:
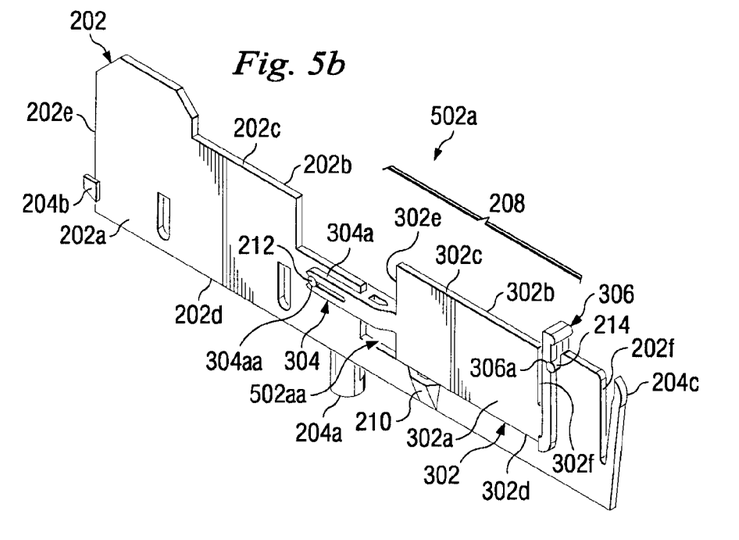
FIG. 5b is a perspective view illustrating an embodiment of an air directing apparatus including the first air directing member of FIGS. 2a and 2b and the second air directing member of FIG. 3.
Figure 5C:
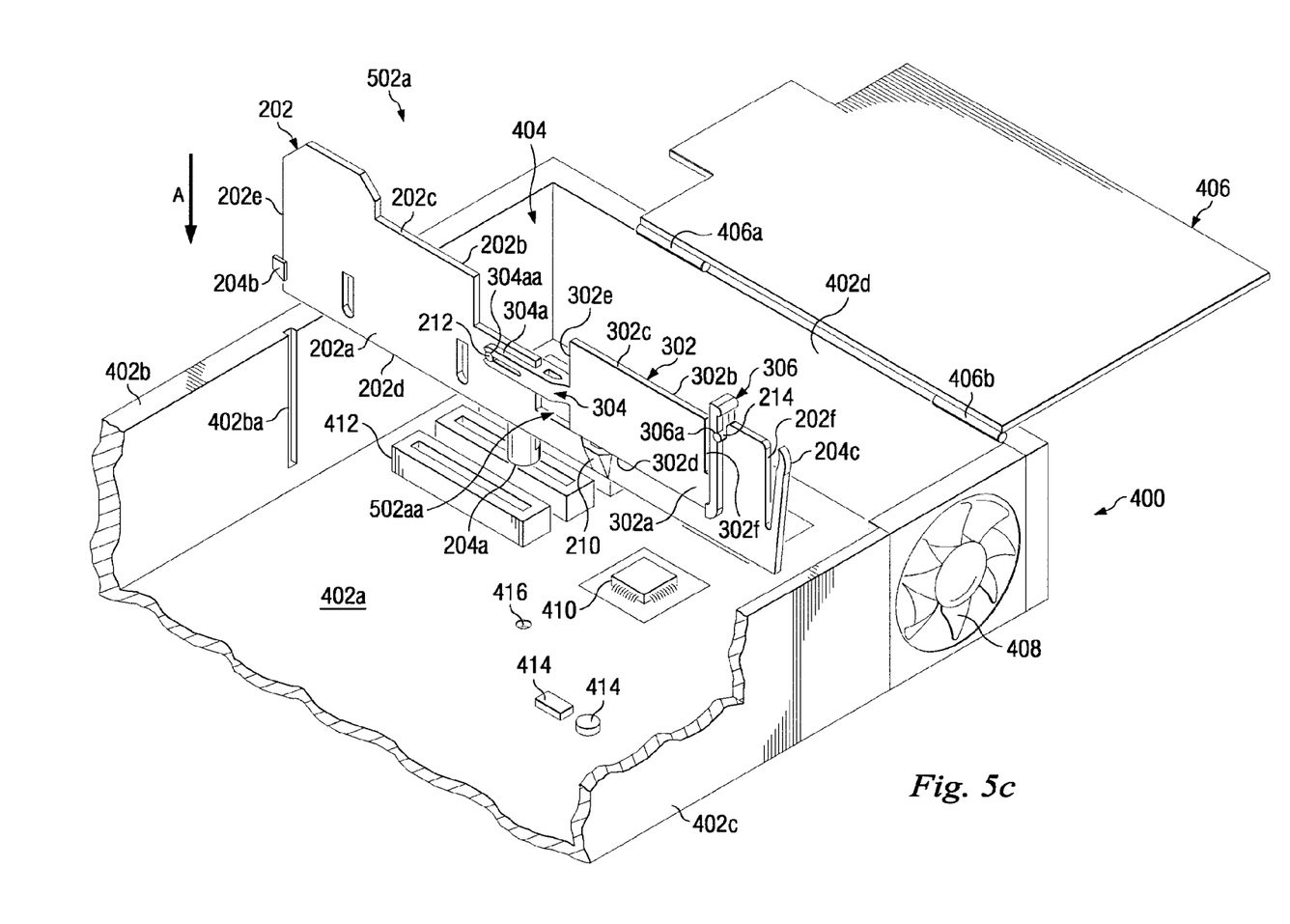
FIG. 5c is a perspective view illustrating an embodiment of the air directing apparatus of FIG. 5b being coupled to the chassis of FIG. 4.
Figure 5D:
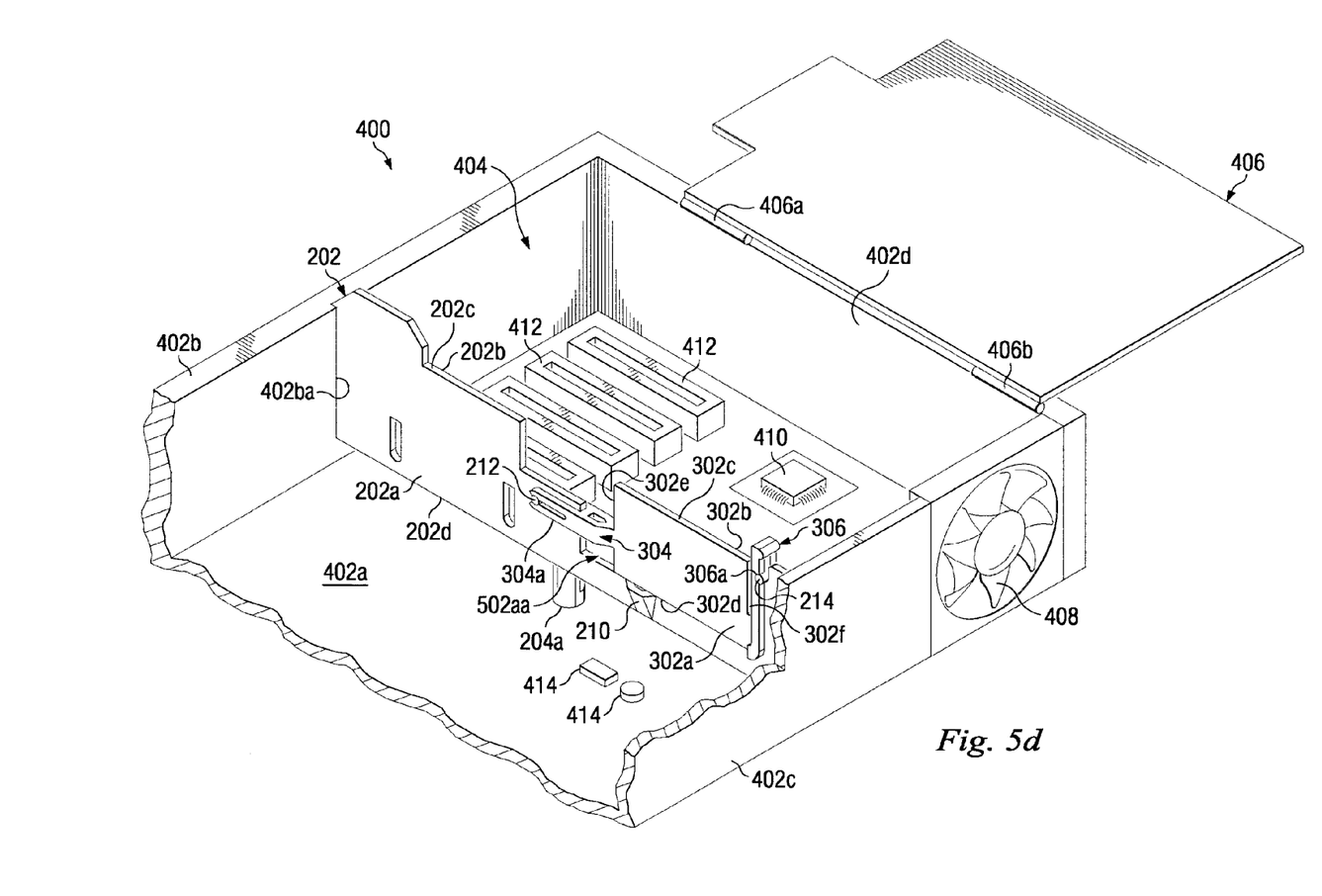
FIG. 5d is a perspective view illustrating an embodiment of the air directing apparatus of FIG. 5b coupled to the chassis of FIG. 4.
Figure 5E:
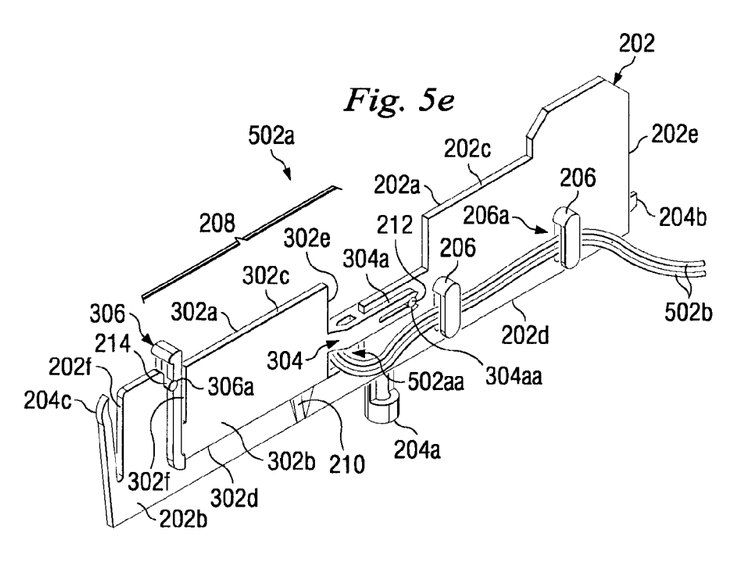
FIG. 5e is a perspective view illustrating an embodiment of a plurality of cables coupled to the air directing apparatus of FIG. 5b.
Figure 5F:
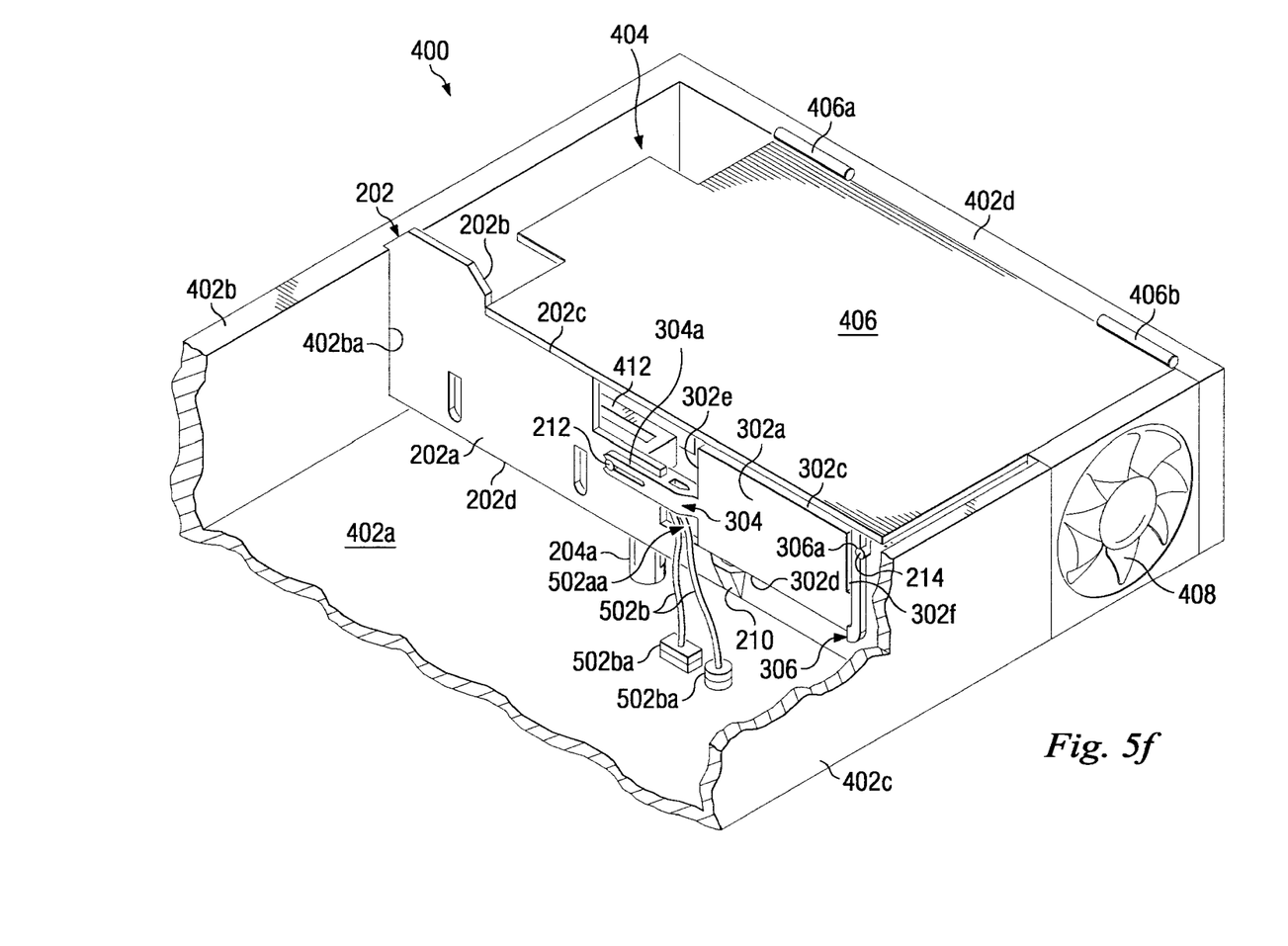
FIG. 5f is a perspective view illustrating an embodiment of the air directing apparatus of FIG. 5b coupled to the chassis of FIG. 4 with the second air directing member positioned in the component access passageway such that air may be directed by the apparatus.

Referring now to FIGS. 2a, 5a, 5b, 5c, 5d, 5e and 5f, a method 500 for directing air in a chassis is illustrated. The method 500 begins at step 502 where the chassis 400 including an air directing apparatus is provided. The second air directing member 300 is pivotally coupled to the first air directing member 200 by positioning the pivotal coupling feature 212 on first air directing member 200 in the pivotal coupling feature channels 304aa defined by the arms 304 on second air directing member 300 such that a portion of the base 202 is positioned in the channel 304b, as illustrated in FIG. 5b. With the second air directing member 300 coupled to the first air directing member 200, an air directing apparatus 502a is provided and a cable routing channel 502aa is defined between the first air directing member 200 and the second air directing member 300. The air directing apparatus 502a is then coupled to the chassis 400 by positioning the air directing apparatus 502a adjacent the chassis 400 such that the side edge 202e of the first air directing member 200 is located adjacent the securing channel 402ba defined by the side wall 402b, the chassis coupling member 204c on the first air directing member 200 is located adjacent the side wall 402c, and the bottom edge 202d of the first air directing member 200 is located adjacent the chassis housing 404, as illustrated in FIG. 5c. The air directing apparatus 502a is then moved in a direction A such that the chassis coupling member 204b and the side edge 202e of the first air directing member 200 enter the securing channel 402ba, the chassis coupling member 204a is aligned with the air directing member securing aperture 416, and the chassis coupling member 204c engages the side wall 402c of the chassis 400, as illustrated in FIG. 5d. The air directing member 502a may be secured to the chassis 200, for example, by engaging the chassis coupling member 204a and the air directing member securing aperture 416 with a fastener. A plurality of cables 502b including connectors 502ba may be coupled to the first air directing member 200 by positioning the cables 502b in the cable securing passageways 206a defined by the cable routing features 206, as illustrated in FIG. 5e. The connectors 502ba on the cables 502b may be engaged with the plugs 414 after positioning the cables 502b in the 502aa, as illustrated in FIG. 5f. In an embodiment, the component access channel 210 allows, for example, a lever on the processor 410 to rotate past the air directing apparatus 502a in order to allow access to the processor 410.

The method 500 then proceeds to step 504 where the second air directing member 300 is moved into the component access passageway 208 defined by the first air directing member 200. As illustrated in FIGS. 5b, 5d, 5e and 5f, the second air directing member 300 has been pivoted about its coupling to the first air directing member 200 such that the second air directing member 300 is located in the component access passageway 208. With the second air directing member 300 located in the component access passageway 208, the second air directing member securing feature 214 is positioned in the first air directing member securing feature 306a to secure the second air directing member 300 in the component access passageway 208. The method 500 then proceeds to step 506 where air is directed from a fan with the air directing apparatus 502a. The top wall 406 may be pivoted about the pivotal couplers 406a and 406b such that it becomes substantially level with the top edge 202c of the first air directing member 200. The fan 408 may then be operated, causing air to flow through the chassis housing 404 while that air is directed over components in the chassis housing 404 by the air directing member 502a. In an embodiment, the device couplers 412 may include heat producing components such as, for example, memory devices, and the processors 410 may include heat sinks coupled to them such that the air flow through the chassis housing 404 from the fan 408 is used to cool the memory devices and the processors 410 through the heat sinks.

Figure 5G:
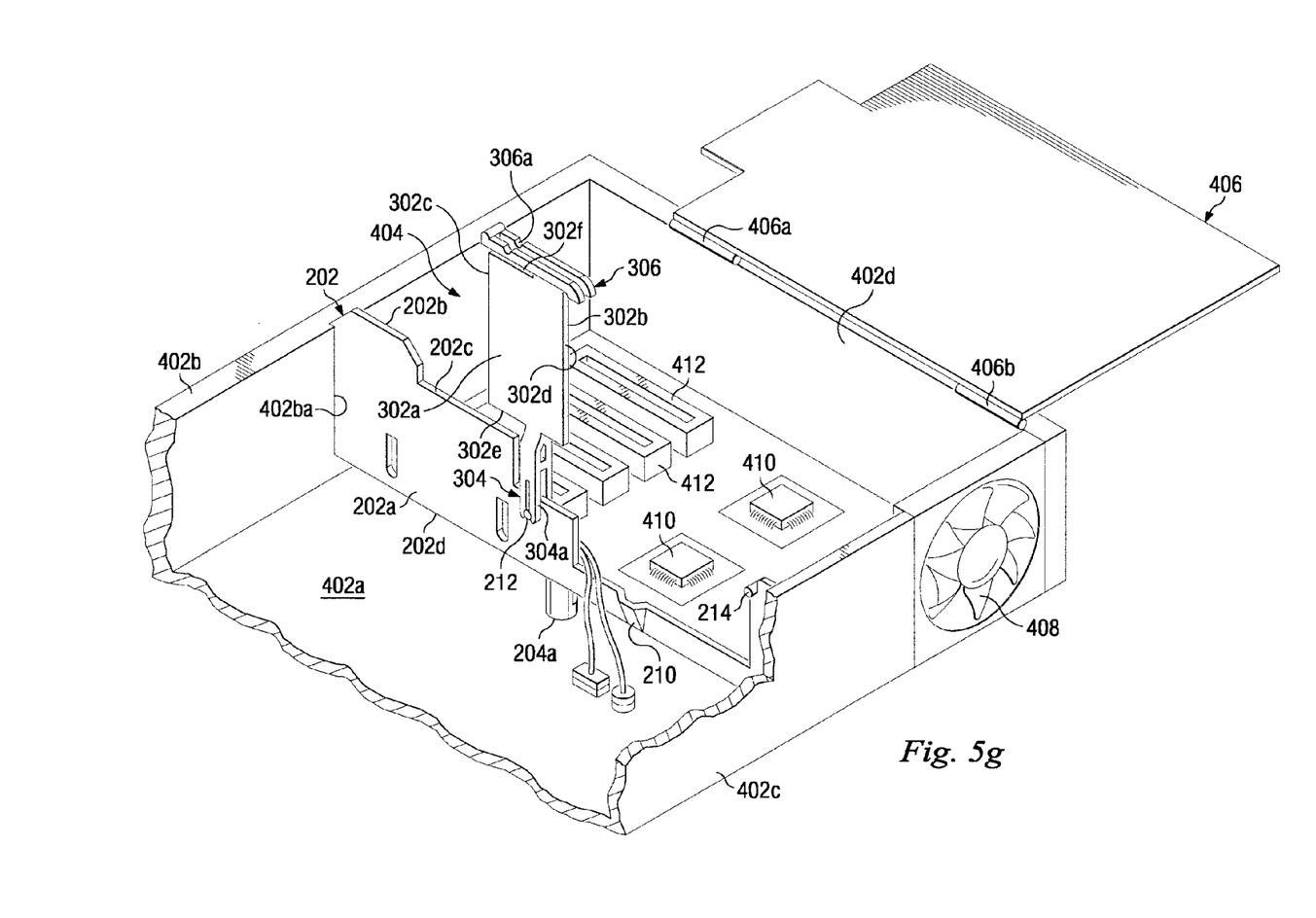
FIG. 5g is a perspective view illustrating an embodiment of the air directing apparatus of FIG. 5b coupled to the chassis of FIG. 4 with the second air directing member positioned out of the component access passageway such components may be accessed in the chassis.

Referring now to FIGS. 2a, 5a and 5g, the method 500 then proceeds to step 508 where the second air directing member 300 is moved out of the component access passageway 208. The top wall 406 is pivoted about the pivotal couplers 406a and 406b. The second air directing member securing feature 214 may be moved out of the first air directing member securing feature 306a by deflecting securing member 306 towards the side edge 302f of the second air directing member 300. The second air directing member 300 may then be pivoted about its coupling to the first air directing member 200 such that the second air directing member 300 is located out of the component access passageway 208, as illustrated in FIG. 5g. The method 500 then proceeds to step 510 where components are accessed through the component access passageway 208. With the second air directing member 300 located out of the component access passageway 208, components such as, for example, the processors 410, may be accessed by a user through the component access passageway 208. The component access passageway 208 is particularly helpful when an IHS is being manufactured on an assembly line and the user is accessing the chassis from a position opposite the rear wall 402d such that access to the processors 410 would be impeded by the air directing apparatus 502a without the second air directing member 300 being moved out of the component access passageway 208. Furthermore, with the second air directing member 300 moved out of the component access passageway 208, the top wall 406 may not be closed due to the engagement of the top wall 406 and the second air directing member 300. This ensures that the second air directing member 300 must be located in the component access passageway 208 when the top wall 406 is closed so that the air directing member 502a functions optimally. Thus, a method and apparatus are provided that allow air to be directed in a chassis but also allows access to components in the chassis through the apparatus directing the air in order to allow an IHS to be easily built in the chassis.

Figure 6A:
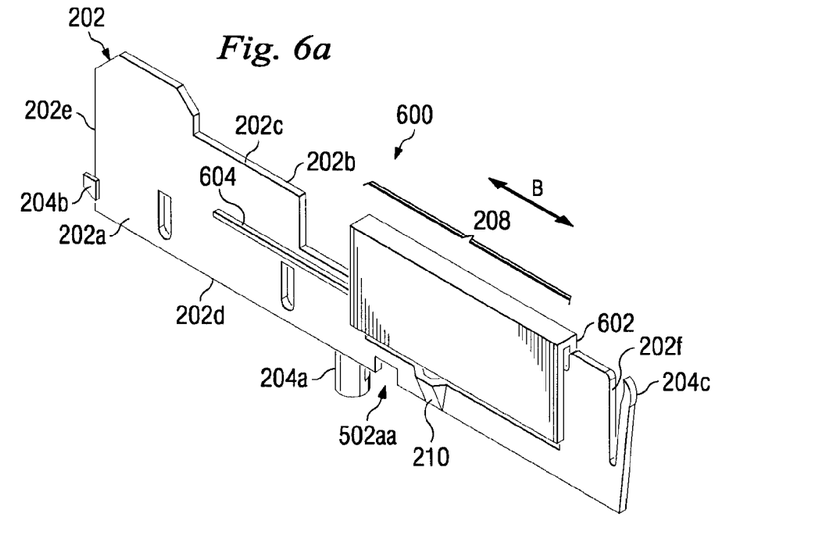
FIG. 6a is a perspective view illustrating an alternative embodiment of an air directing apparatus with a second air directing member positioned in the component access passageway.
Figure 6B:
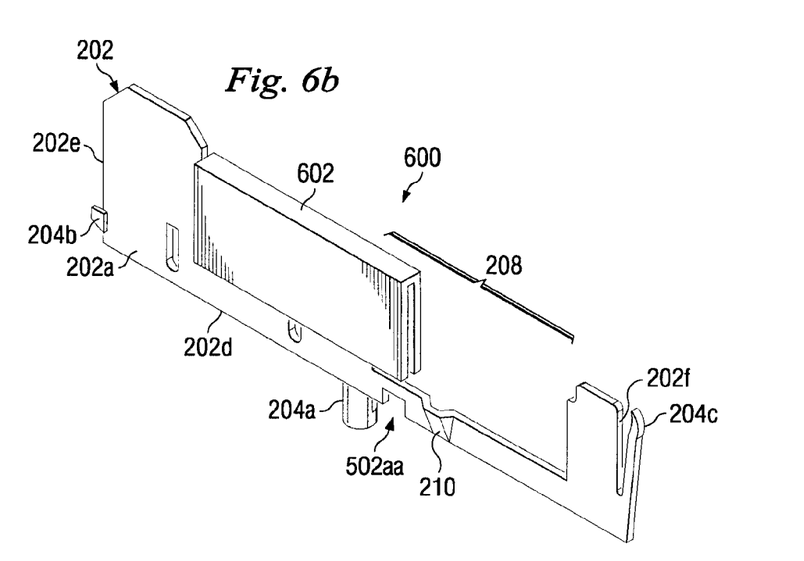
FIG. 6b is a perspective view illustrating an alternative embodiment of an air directing apparatus with a second air directing member positioned out of the component access passageway.

Referring now to FIGS. 6a and 6b, in an alternative embodiment, an air directing apparatus 600 is substantially similar in design and operation to the air directing apparatus 502a, described above with reference to FIGS. 1, 2a, 2b, 3, 4, 5a, 5b, 5c, 5d, 5e, 5f and 5g, with the provision of a second air directing member 602 replacing the second air directing member 300, a slidable coupling feature 604 replacing the pivotal coupling feature 212 on first air directing member 200, and the cable routing channel 502aa defined my the first air directing apparatus 200. The slidable coupling feature 604 may extend from both the front surface 202a of the first air directing member 200, illustrated in FIG. 6a, and the rear surface 202b of the first air directing member 200, not shown. The second air directing member 602 is coupled to the slidable coupling feature 604 using methods known in the art. The second air directing member 602 may slide along the length of the first air directing member 200 in a direction B in order to move the second air directing member 602 in and out of the component access passageway 208, as illustrated in FIGS. 6a and 6b. In an embodiment, the first air directing member 200 and the second air directing member 300 or 602 may have various geometries to allow for varying component geometries that may protrude past the air directing apparatus 502a or 600.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An air directing apparatus, comprising:
   a first air directing member defining a component access passageway, wherein the first air directing member comprises a cable routing feature; and
   a second air directing member moveably coupled to the first air directing member, whereby the second air directing member is moveable relative to the first air directing member into a first position and a second position, wherein with the second air directing member in the first position the component access passageway is substantially obstructed and with the second air directing member in the second position the component access passageway is substantially unobstructed.

2. The apparatus of claim 1, wherein the first air directing member comprises at least one chassis coupling member.

3. The apparatus of claim 1, wherein the first air directing member comprises a second air directing member securing feature, whereby the second air directing member engages the second air directing member securing feature when the second air directing member is in the first position.

4. The apparatus of claim 1, wherein the first air directing member defines a cable routing channel located adjacent the component access passageway.

5. The apparatus of claim 1, wherein the second air directing member is operable to moveably couple to and decouple from the first air directing member without the use of a tool.

6. The apparatus of claim 1, wherein the second air directing member is pivotally coupled to the first air directing member, whereby the second air directing member is pivotable from the first position to the second position.

7. The apparatus of claim 1, wherein the second air directing member is slideably coupled to the first air directing member, wherein the second air directing member is slidable between the first position and the second position.

8. The apparatus of claim 1, wherein the second air directing member comprising a first air directing member securing feature, whereby the first air directing member engages the first air directing member securing feature when the second air directing member is in the first position.

9. An information handling system (IHS), comprising:
   an IHS chassis;
   a fan mounted in the chassis;
   an IHS component coupled to the chassis; and
   an air directing apparatus coupled to the chassis, located adjacent the IHS component, and operable to direct air from the fan, the air directing apparatus comprising:
      a first air directing member defining a component access passageway that is located immediately adjacent the IHS component; and
      a second air directing member moveably coupled to the first air directing member, whereby the second air directing member is moveable relative to the first air directing member into a first position and a second position, wherein with the second air directing member in the first position the component access passageway is substantially obstructed and the first air directing member and the second air directing member are operable to direct air from the fan, and with the second air directing member in the second position the component access passageway is substantially unobstructed and the IHS component is accessible through the component access passageway.

10. The system of claim 9, wherein the first air directing member comprises at least one chassis coupling member that engages the IHS chassis and couples the first air directing member to the IHS chassis.

11. The system of claim 9, wherein the first air directing member comprises a second air directing member securing feature, whereby the second air directing member engages the second air directing member securing feature when the second air directing member is in the first position.

12. The system of claim 9, wherein the first air directing member comprises a cable routing feature, whereby a cable is coupled to the cable routing feature.

13. The system of claim 9, wherein the first air directing member defines a cable routing channel located adjacent the component access passageway, whereby a cable is located in the cable routing channel.

14. The system of claim 9, wherein the second air directing member is operable to moveably couple to and decouple from the first air directing member without the use of a tool.

15. The system of claim 9, wherein the second air directing member is pivotally coupled to the first air directing member, whereby the second air directing member is pivotable from the first position to the second position.

16. The system of claim 9, wherein the second air directing member is slideably coupled to the first air directing member, wherein the second air directing member is slidable between the first position and the second position.

17. A method of directing air in an IHS chassis, comprising:
   providing an IHS chassis comprising an IHS component located in the chassis, a fan coupled to the chassis, and an air directing apparatus located adjacent the IHS component, wherein the air directing apparatus comprises a first air directing member defining a component access passageway and a second air directing member moveably coupled to the first air directing member;
   moving the second air directing member into the component access passageway; and
   directing air from the fan with the first air directing member and the second air directing member.

18. The method of claim 17, further comprising:
   moving the second air directing member out of the component access passageway; and
   accessing the IHS component through the component access passageway.

19. The method of claim 18, further comprising:
   coupling a cable to the first air directing member to route the cable through the IHS chassis.

\* \* \* \* \*